United States Patent
Archer et al.

(10) Patent No.: US 7,451,342 B2
(45) Date of Patent: Nov. 11, 2008

(54) BISECTIONAL FAULT DETECTION SYSTEM

(75) Inventors: Charles Jens Archer, Rochester, MN (US); Kurt Walter Pinnow, Rochester, MN (US); Joseph D. Ratterman, Rochester, MN (US); Brian Edward Smith, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 493 days.

(21) Appl. No.: 11/052,663

(22) Filed: Feb. 7, 2005

(65) Prior Publication Data

US 2006/0179271 A1 Aug. 10, 2006

(51) Int. Cl.
*G06F 11/00* (2006.01)

(52) U.S. Cl. ......................................................... 714/4
(58) Field of Classification Search ...................... 714/4, 714/43
See application file for complete search history.

(56) References Cited

U.S. PATENT DOCUMENTS

| | | | |
|---|---|---|---|
| 4,320,508 A | 3/1982 | Takezoe | |
| 5,230,047 A | 7/1993 | Frey, Jr. et al. | |
| 5,325,518 A | 6/1994 | Bianchini, Jr. | |
| 5,537,653 A | 7/1996 | Bianchini, Jr. | |
| 5,561,769 A | 10/1996 | Kumar et al. | |
| 5,684,807 A | 11/1997 | Bianchini, Jr. et al. | |
| 5,920,267 A | 7/1999 | Tattersall et al. | |
| 6,108,796 A | 8/2000 | Lasken | |
| 6,714,552 B1 | 3/2004 | Cotter | |
| 6,880,100 B2 * | 4/2005 | Mora et al. | 714/4 |
| 7,046,621 B2 | 5/2006 | Wang et al. | |
| 7,058,008 B1 | 6/2006 | Wilson et al. | |
| 7,058,848 B2 * | 6/2006 | Sicola et al. | 714/4 |
| 7,085,959 B2 | 8/2006 | Safford | |
| 7,139,925 B2 | 11/2006 | Dinker et al. | |
| 7,149,920 B2 * | 12/2006 | Blumrich et al. | 714/4 |
| 2001/0052084 A1 * | 12/2001 | Huang et al. | 714/4 |
| 2002/0133756 A1 * | 9/2002 | Jain | 714/43 |
| 2003/0023893 A1 | 1/2003 | Lee et al. | |
| 2003/0198251 A1 | 10/2003 | Black et al. | |
| 2004/0008719 A1 | 1/2004 | Ying | |
| 2005/0198097 A1 | 9/2005 | Kalnitsky | |
| 2005/0246569 A1 | 11/2005 | Ballew et al. | |
| 2006/0117212 A1 * | 6/2006 | Meyer et al. | 714/4 |

OTHER PUBLICATIONS

Almasi, et al., "Optimization of MPI Collective Communication on BlueGene/L Systems", ICS'05, Jun. 20-22, Boston, MA, USA (10 Pages).
Azeez, et al., "I/O Node Placement for Performance and Reliability in Torus Networks", Proceedings of the 18th IASTED International Conference on Parallel and Distributed Computing and Systems (PDCS), 2006 (6 pages).
Park, et al., "Fault-Tolerant Broadcasting in Wormhole-Routed Torus Networks", Proceedings of the International Parallel and Distributed Processing Symposium 2002 (6 pages).
Cunningham et al. "Fault-Tolerant Adaptive Routing for Two-Dimensional Meshes." IEEExplore.

* cited by examiner

*Primary Examiner*—Marc Duncan
(74) *Attorney, Agent, or Firm*—Wood, Herron & Evans, LLP

(57) ABSTRACT

An apparatus, program product and method logically divides a group of nodes and causes node pairs comprising a node from each section to communicate. Results from the communications may be analyzed to determine performance characteristics, such as bandwidth and proper connectivity.

3 Claims, 3 Drawing Sheets

BISECTIONAL FAULT DETECTION SYSTEM

This invention was made with Government support under Contract No. B519700 awarded by the Department of Energy. The Government has certain rights in this invention.

CROSS-REFERENCE TO RELATED APPLICATIONS

This application is related to the following U.S. Patent Applications all filed on even date herewith by Charles Jens Archer et al.: Ser. No. 11/052,658, entitled "ALL-TO-ALL SEQUENCED FAULT DETECTION SYSTEM," Ser. No. 11/052,659, entitled "CELL BOUNDARY FAULT DETECTION SYSTEM," Ser. No. 11/052,660, entitled "ROW FAULT DETECTION SYSTEM," Ser. No. 11/052,661, entitled "MULTI-DIRECTIONAL FAULT DETECTION SYSTEM," and Ser. No. 11/052,662, entitled "ALL ROW, PLANAR FAULT DETECTION SYSTEM,". The present application is also related to U.S. Patent Application filed on even date herewith by John A. Gunnels et al., Ser. No. 11/050,945, entitled "SYSTEM AND METHOD FOR DETECTING A FAULTY OBJECT IN A SYSTEM,". Each of these applications is incorporated by reference herein.

FIELD OF THE INVENTION

The invention is generally directed to parallel processing computer systems, and in particular, to fault detection in parallel processing computer systems.

BACKGROUND OF THE INVENTION

Parallel processing computer systems have found application in a number of different computing scenarios, particularly those requiring high performance and fault tolerance. For instance, airlines rely on parallel processing to process customer information, forecast demand and decide what fares to charge. The medical community uses parallel processing supercomputers to analyze magnetic resonance images and to study models of bone implant systems. A parallel processing architecture generally allows several processors having their own memory to work simultaneously. Parallel computing systems thus enable networked processing resources, or nodes, to cooperatively perform computer tasks.

The best candidates for parallel processing typically include projects that require many different computations. Unlike single processor computers that perform computations sequentially, parallel processing systems can perform several computations at once, drastically reducing the time it takes to complete a project. Overall performance is increased because multiple nodes can handle a larger number of tasks in parallel than could a single computer.

Other advantageous features of some parallel processing systems regard their scalable, or modular nature. This modular characteristic allows system designers to add or subtract nodes from a system according to specific operating requirements of a user. Parallel processing systems may further utilize load balancing to fairly distribute work among nodes, preventing individual nodes from becoming overloaded, and maximizing overall system performance. In this manner, a task that might otherwise take several days on a single processing machine can be completed in minutes.

In addition to providing superior processing capabilities, parallel processing computers allow an improved level of redundancy, or fault tolerance. Should any one node in a parallel processing system fail, the operations previously performed by that node may be handled by other nodes in the system. Tasks may thus be accomplished irrespective of particular node failures that could otherwise cause a failure in non-parallel processing environments.

Despite the improved fault tolerance afforded by parallel computing systems, however, faulty nodes can hinder performance in the aggregate. It consequently becomes necessary to eventually replace or otherwise fix underperforming nodes and/or associated connections. For instance, it may be advantageous to check for faulty cables, software, processors, memory and interconnections as modular computing components are added to a parallel computing system.

The relatively large number of nodes used in some such systems, however, can complicate node maintenance. Ironically, the very redundancy that enables fault tolerance can sometimes challenge processes used to find faulty nodes. With so many nodes and alternative data paths, it may be difficult to pinpoint the address, or even the general region of a node, or nodal connection requiring service.

As such, a significant need exists for a more effective way of determining and locating faulty nodes in a parallel processing environment.

SUMMARY OF THE INVENTION

The invention addresses these and other problems associated with the prior art by providing an apparatus, program product, and method for determining a nodal fault in a parallel processing computer system, which includes logically dividing a group of nodes in the parallel processing computer system and causing node pairs comprising a node from each section to communicate with each other. In one instance, the nodes may be evenly divided, or bisectioned. Results from the communications may be analyzed to determine performance characteristics, such as bandwidth and proper connectivity.

To this end, aspects of the invention provide a system that creates a communicator configured to facilitate communication assignments between the nodes. The system may further designate a virtual plane(s) used to logically divide the nodes. The orientation of this plane may be changed to determine different results. For instance, the orientation of the plane may sequence through the x, y and z directions, and the respective results may be compared to determine a common potential problem, i.e., nodal fault.

The information pertaining to the nodal fault may be logged and/or used to initiate servicing of the fault. The communications may further be evaluated in terms of latency and bandwidth conformance. Aspects of the invention may further allow multiple node pairs comprising a node from each section to communicate concurrently for efficiency considerations.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

Figure 1:
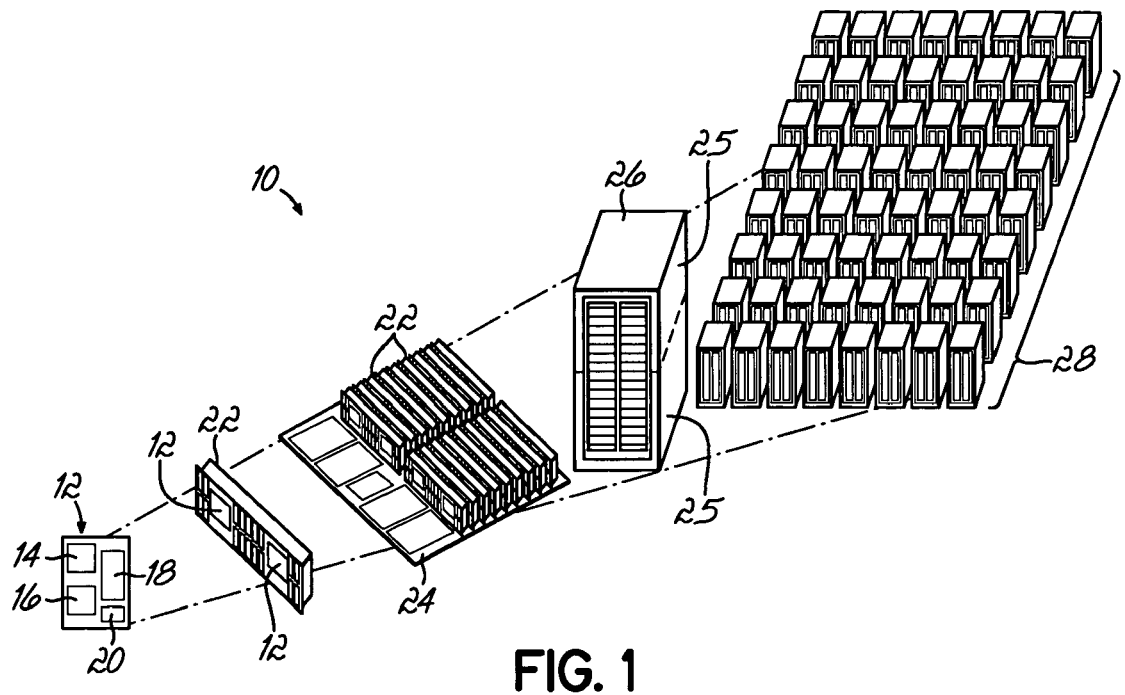
FIG. 1 is a block diagram that includes components of a parallel processing system configured to detect nodal faults using a scalable algorithm that logically divides a group of nodes and causes a node pair comprising nodes from each section to communicate.

Parallel computing systems, such as the BlueGene/L system created by International Business Machines, often include a node cellular architecture. As discuss below in detail, the BlueGene/L system is built from blocks of node midplanes that may be connected through several inter and intra midplane networks. The system may be constructed incrementally, with midplane cells being added to build the larger, final system. As each midplane is added to the system, the hardware and system software must be tested for faulty configurations, including interconnect, processing, memory and software control.

The primary point to point message passing network for BlueGene/L is a three dimensional torus network, where every node is connected to six other nodes in a mesh, forming a cube of (x,y,z) nodes. For example, a 512 node midplane torus consists of an 8×8×8 node arrangement. Torus implies that the nodes on the face of the cube wrap around to connect to nodes on the opposite face. This torus network can be extended in all three directions by connecting the faces of these logical cubes via link chips, which are essentially switches between midplanes. The link chips are connected via cables, while the internal torus is connected via circuitry within the midplane.

The torus network and cellular characteristic of the system permit dynamic rerouting around problematic nodes and links, or nodal faults. However, increased communication costs are incurred each time a rerouted communication must travel through a different level of organization, e.g., node, midplane, etc. For instance, it may take more time for a data packet to be routed over to an adjacent cell than would it to another node in the same cell. This may be because the data packet would have to travel over additional cabling that connects to respective faces of adjacent cells, requiring relatively more travel and processing time. It is consequently desirable to promptly detect and service nodal faults in order to minimize associated boundary changes and rerouting. Unfortunately, the very redundancy designed into the system complicates conventional processes used to find nodal faults. With so many nodes and alternative data paths, pinpointing the location of a node or nodal connection requiring service may be problematic.

To address this need, the present invention capitalizes on features of the system to detect faulty torus links, miscabled midplanes, and bad hardware in general. For instance, compute Application Specific Integrated Circuits (ASIC's) of the BlueGene/L include error detection registers. An error detection register may, for instance, register the number of torus retransmits for each direction. Aspects of the invention may use this data to help pinpoint hardware failures after tests are run. The BlueGene/L compute ASIC will also deliver interrupts to the operating system if the hardware is put into an exceptional state. These two features thus provide a basis for internal (via software) and external (via the control system or system monitoring facilities) fault detection capability.

The processes of the present invention may include first booting the system via a control system. The program code loads may take place using a control network that is completely independent of the torus. Once the program code is loaded on the system and the hardware is initialized, the tests consistent with the invention may be run. After the tests complete, data collection may be performed either via the external hardware interfaces, or through the software interfaces.

Aspects of the present invention provide a system for logically dividing a group of nodes, and furthermore, for causing a node pair comprising nodes from each section to communicate. Results from the bisectional communications may be analyzed to determine performance characteristics, such as bandwidth and proper connectivity.

A cell is typically divided into two halves, each of which may then send/receive data to/from the other half as node-to-node pairs. When the nodes in the two halves are appropriately paired, all communications between those two nodes will occur over a single ring in the three dimensional torus. When all the nodes are communicating with their respective pairs at the same time, all communication rings on the system in a given dimension are being tested.

A node in one section is typically, but not necessarily, paired off with the furthest node in the other section. This feature applies the most stress to the links, increasing the likelihood of determining a nodal fault.

The test results may then be calculated on a per ring basis, allowing a tester to quickly determine which communication rings contain bad links. If the test is run in three stages, so that each of the three communication directions is tested, it is possible to determine the location of a single bad node given the intersection of at least two rings that are performing poorly in the test. That is, after running a test three times, i.e., once in the x, y and z directions, it is possible to get information that intersects and is useful for pinpointing a faulty node (s). If conventionally checking each link on a system takes time $O(p)$, aspects of the present invention scales that time down to approximates $O(p^{1/3})$, allowing for all of the links to be checked relatively quickly.

Turning to the Drawings, wherein like numbers may denote like parts throughout several views, FIG. 1 shows components 12, 22, 24, 26 of a parallel processing system 28 configured to detect nodal faults using a scalable algorithm. FIG. 1 more particularly shows a parallel computing system 28, or apparatus, such as the BlueGene/L. The system 28 comprises a highly scalable, cellular architecture that can be replicated in a regular pattern, with no introduction of bottlenecks as the system is scaled up.

The parallel processing system 28 fundamentally includes a plurality of nodes 12. Each node 12 typically comprises two ASIC's 14, 16, a local cache memory 18 and an Input/Output (I/O) interface 20. ASIC's 14, 16 share external memory 29 located on a card 22, onto which two nodes 12 mount. Sixteen cards 22 are typically placed on a node board 24. Sixteen node boards 24 comprise a midplane, or cell 25, two of which may be positioned inside a cabinet 26 for a total of 1024 nodes, or 512 nodes per cell. The system 28 includes sixty-four cabinets and over sixty-five thousand nodes.

The nodes 12 may be interconnected through multiple, complementary highspeed and low latency networks. The networks typically include a three-dimensional torus network that wraps around the edges, and a combining tree network for fast global operations. The torus network includes point-to-point, serial links between routers embedded within the system ASIC's. As such, each ASIC has six nearest-neighbor connections, some of which may traverse relatively long cables.

Though not shown, the system 28 may include a front end, host computer used for compiling, diagnostics and/or analysis. An I/O node of the system 28 may handle communications between a compute node and other systems, including the host and file servers. The choice of host may depend on the class of applications, as well as their bandwidth and performance requirements.

Figure 2:
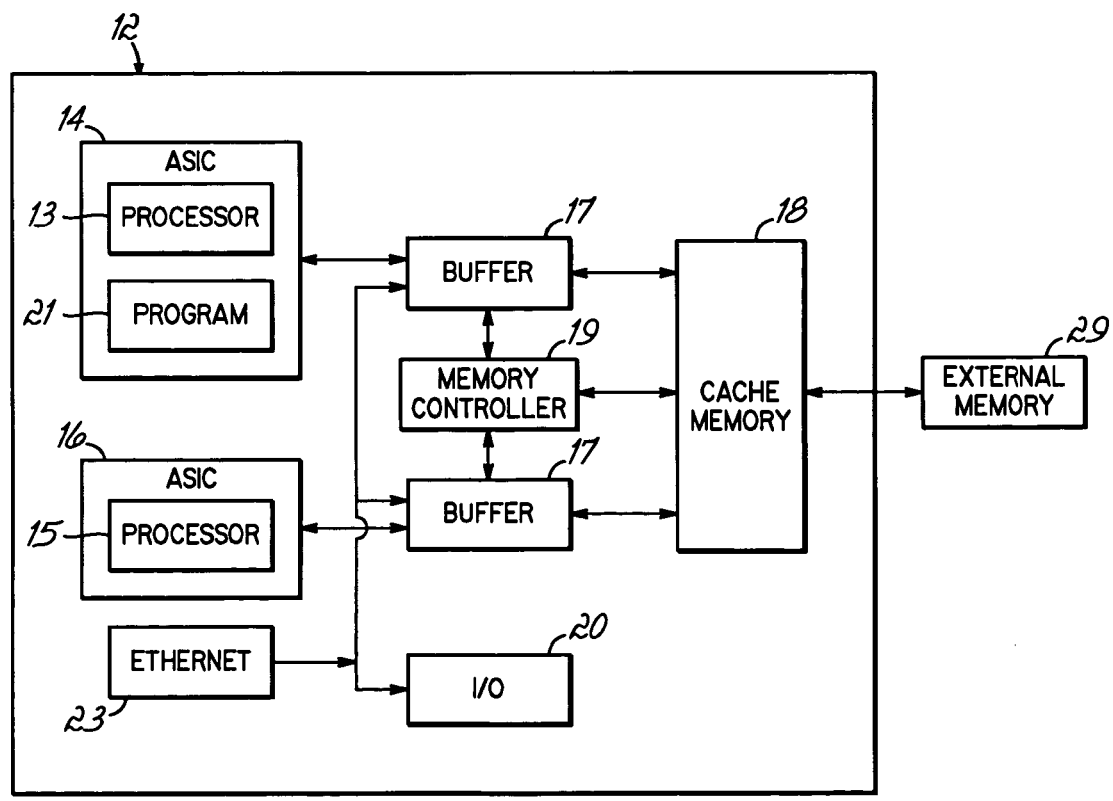
FIG. 2 is a block diagram of a node of the parallel processing system of FIG. 1.

FIG. 2 is a block diagram of a node 12 of the parallel processing system 28 of FIG. 1. The BlueGene/L node 12 includes a compute ASIC 14 comprising necessary network interfaces and on-chip memory. An on-chip memory controller 19 provides access to cache memory 18, such as Synchronous Dynamic Random Access Memory (SDRAM) memory chips.

In addition to the compute ASIC 14, each node 12 may include a link ASIC 16 for messaging. When crossing a cell boundary, network interrupt signals pass through the link ASIC 16. This link ASIC 16 re-drives signals over cables between cells and redirects signals between its different ports. These design features allow improved signal quality and less traffic interference. These features also enable additional cells to be cabled as spares to the system and used, as needed, upon failures. Each of the partitions formed through this manner has its own torus, tree and barrier networks that are isolated from all traffic from all other partitions.

Processors 13, 15 of the respective ASIC's 14, 16 thus communicate with the cache memory 18, memory controller 19 and associated buffers 17. Furthermore, one or more of the ASIC's 14, 16 may couple to a number of external devices, including an input/output interface 20, memory 29, a workstation controller (not shown) and an Ethernet interface 23.

One skilled in the art will appreciate that any number of alternate computer architectures may be used in the alternative. That is, while the node 12 of FIG. 2 comprises a specific hardware implementation having particular application within the context of an embodiment consistent with the invention, it is not intended to limit the scope of the invention. It should consequently be appreciated that the invention may be implemented in other computers and data processing systems, e.g., in single or multi-user computers such as workstations, desktop computers, portable computers, server computers and the like, or in other programmable electronic devices (e.g., incorporating embedded controllers and the like). That is, the number of card, processors, slots, etc., and network configurations may change according to application specifications.

The discussion hereinafter will focus on the specific routines utilized to implement the above-described system 28. The routines executed to implement the embodiments of the invention, whether implemented as part of an operating system or a specific application, component, program, object, module or sequence of instructions executed by node or other processors, will also be referred to herein as "computer program code," or simply "program code." The computer program code typically comprises one or more instructions that are resident at various times in various memory and storage devices in a computer, and that, when read and executed by one or more nodal or other processors of a computer system, cause that system to perform the steps necessary to execute steps or elements embodying the various aspects of the invention. For instance, program 21 may enable checking for nodal faults. "Nodal" for purpose of this specification may refer to the hardware or software relating to a node, including a connection associated with a node.

Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of computer readable signal bearing media used to actually carry out the distribution. Examples of computer readable signal bearing media include but are not limited to recordable type media such as volatile and nonvolatile memory devices, floppy and other removable disks, hard disk drives, optical disks (e.g., CD-ROM's, DVD's, etc.), among others, and transmission type media such as digital and analog communication links.

In addition, various program code described hereinafter may be identified based upon the application or software component within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, APIs, applications, applets, etc.), it should be appreciated that the invention is not limited to the specific organization and allocation of program functionality described herein.

Figure 3:
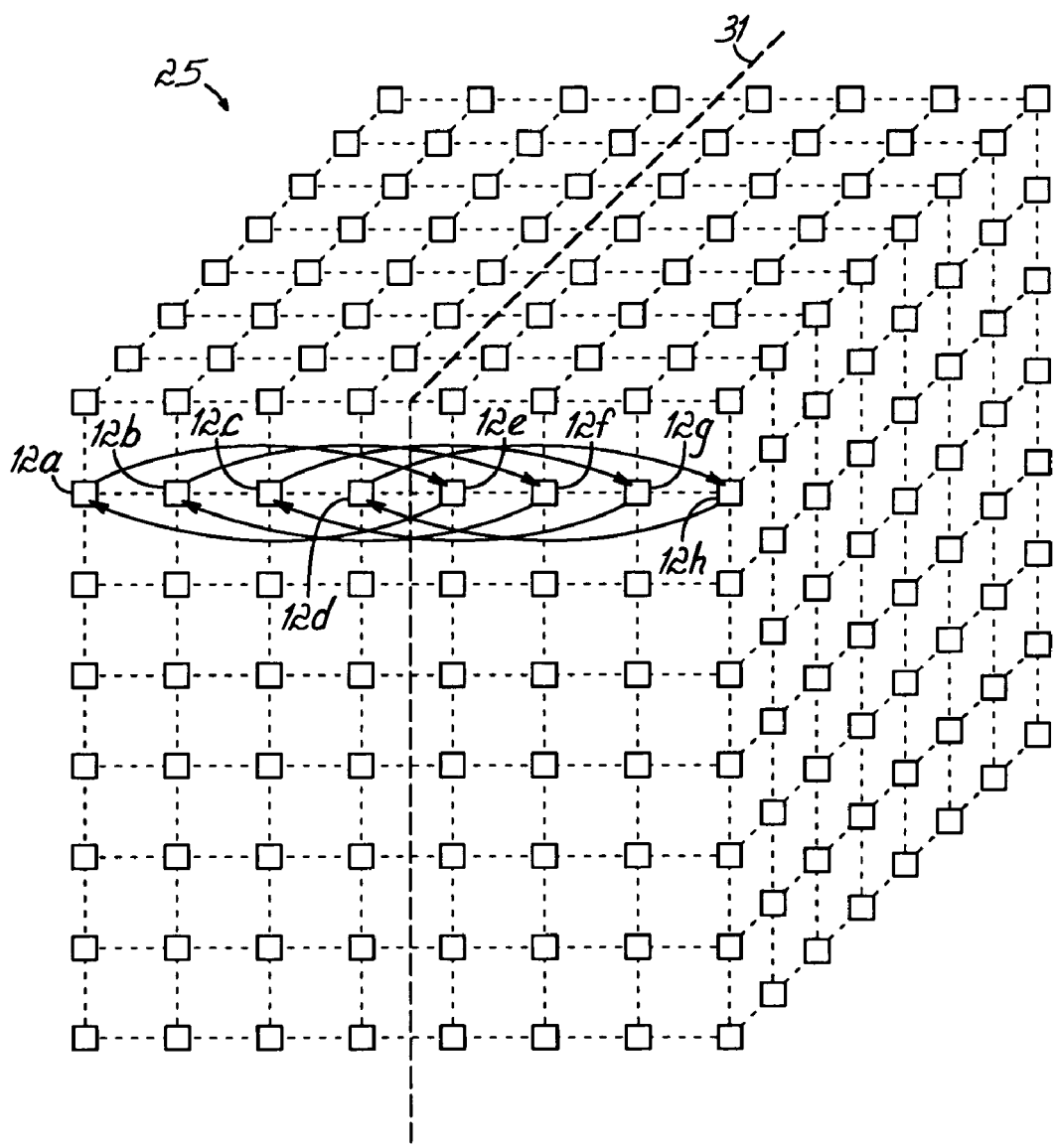
FIG. 3 is a block diagram of a midplane of the parallel processing system of FIG. 1.

FIG. 3 is a block diagram of a midplane, or cell 25, of the parallel processing system 28 of FIG. 1. The exemplary cell 25 includes an eight-by-eight-by-eight structure of 512 interconnected computing nodes. In the context of the present invention, the cell 25 includes a virtual plane 31 extending along the y direction. The plane 31 logically divides the cell 25 into two halves. FIG. 3 also shows communicator comprising a row of nodes 12a-12h that extend along the x direction. The plane 31 divides this row such that nodes 12a-12d are on one side of the plane 31, while nodes 12e-h are on the other. Hence, the row of nodes 12a-h is bisectional.

Program code 21 executed by the ASIC's may cause each of nodes 12a, 12b, 12c and 12d to pair and communicate with a respective, paired node, 12e, 12f, 12g, or 12h. It may be advantageous to have nodes pair with their most distant, bisectioned counterpart node. Because nodes of the cell 25 may potentially wrap around in the torus network, the most distance between two nodes in an eight-by-eight-by-eight cell is three nodes. As such, 12a communicates with 12e, 12b with 12f, 12c with 12g, and 12d communicated with 12e. As represented by the arrows of FIG. 3, the nodes 12a-h both send and receive packet data with their respective partner node.

One skilled in the art will appreciate that other schemes may be used to pair nodes, and it only matters that the paired nodes are in different logical sections. One skilled in the art will further appreciate that while the plane 31 is shown extending in the y direction, a typical testing sequence may use planes in the x and z planes, as well. Moreover, a cell may be divided by multiple planes extending in the same direction where, for instance, it is beneficial to further reduce the number of nodes in a logical section. As such, while applications of the present invention may particularly lend themselves to bisectional processes, one skilled in the art will appreciate that other, multi-sectional applications may be used in accordance with the underlying principles of the present invention.

Those skilled in the art will recognize that the exemplary environments illustrated in FIGS. 1-3 are not intended to limit the present invention. While the nodes 12 of FIGS. 1-3 are shown connected in a modular fashion, any combination of local area networks (LAN's), wide area networks (WAN's) and/or other networking topologies known in the art may alternatively be used to network computing processors comprising nodes. Individual nodes may thus not be physically located in close proximity with other nodes, i.e., be geographically separated from other nodes as is well known in the art. Moreover, a wide variety of interconnection types, network types, member types, etc., may be permitted to coexist with one another in an efficient and reliable manner in parallel computing system. Indeed, those skilled in the art will recognize that other alternative hardware and/or software environments may be used without departing from the scope of the invention.

Figure 4:
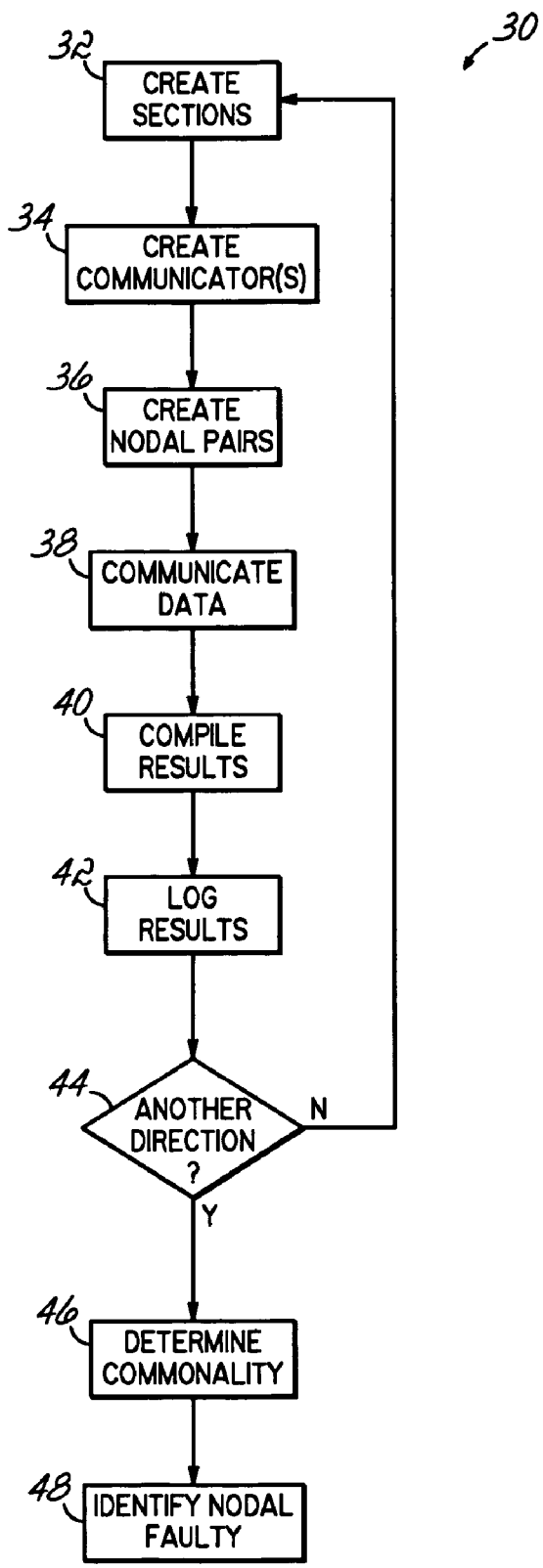
FIG. 4 is a flowchart having a set of exemplary steps executable by the system of FIG. 1 for conducting a bisectional nodal fault test.

FIG. 4 is a flowchart 30 having a set of exemplary steps executable by the system 28 of FIG. 1 for conducting a bisectional nodal fault test. More particularly, they system 28 may create or otherwise designate sections at block 32. As discussed herein, these sections may be created by logically dividing nodes of a cell 25. In one embodiment, the cell is bisectioned, or divided in two by and along a virtual plane 31.

Based on the direction of the plane 31, the system 28 may create at block 34 one or more communicators. Each communicator may, for instance, comprise a row of nodes 12a-12h. The orientation of the communicators is typically perpendicular to the dividing plane 31.

The system 28 may at block 36 create node pairs across the plane 31, or bisectional divider. It may be advantageous to have nodes pair with their most distant, bisectioned counterpart node. Because nodes of the cell 25 may potentially wrap around in the torus network, the most distance between two nodes in an eight-by-eight-by-eight cell is three nodes. Other pairing schemes, however, may be accommodated by the principles of the present invention.

The nodes 12 of the cell 25 may then communicate at block 38. For instance, each node of the pair may send and receive data from the partner node located in the other section.

The results of the sectional communications may be analyzed at block 40. Analysis may pertain to the bandwidth and/or latency of the communications, among other performance parameters.

The system 28 may record the results in memory at block 42. For instance, logged information may pertain to those links and nodes and/or communicators associated with suspect performance, including a failed communication. As discussed herein, such information may be used to specifically locate and otherwise determine nodal faults.

If measurements in another direction are desired at block 44, i.e., the y or z direction, the system 28 may repeat the bisectional analysis processes beginning at block 32. This feature may provide additional data used in conjunction with the results stored at block 42 to triangulate nodal faults. For instance, the system 28 at block 46 may enable review all results at the conclusion of a testing sequence to determine the presence of common nodes, indicating a potential fault. These nodal faults may then be flagged at block 48 for further inspection or service.

While the present invention has been illustrated by a description of various embodiments and while these embodiments have been described in considerable detail, it is not the intention of the applicants to restrict, or in any way limit, the scope of the appended claims to such detail. For instance, any of the steps of the above exemplary flowcharts may be deleted, augmented, made to be simultaneous with another or be otherwise altered in accordance with the principles of the present invention. Additional advantages and modifications will readily appear to those skilled in the art.

One skilled in the art will further appreciate that while the processes of the present invention may provide particular advantages within the context of parallel processing systems, the principles of the invention further may apply to many other applications, to include most nodal fault detection operations. Furthermore, while cells discussed herein are described generally in the context of midplanes, one skilled in the art will appreciate that a midplane is just one type of cell in accordance with the principles of the present invention.

Moreover, while a cell comprises a grouping of nodes as discussed herein, a cell more particularly includes a grouping of nodes that communicates more quickly with each other than with other nodes. For instance, intra-cell communications generally require less cabling and associated routing processes. Furthermore, while the midplane cell of FIG. 3 shows a cubical structure, one skilled in the art will appreciate that cells may take on additional symmetric and asymmetric shapes, including those having more or less than six faces. Relatedly, while the torus network is a three dimensional network, networks and associated hardware/software may implicate fewer or more dimensions. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. A method for determining a nodal fault within a parallel processing system having a plurality of nodes, the method comprising:

determining first and second sections, wherein each section comprises a portion of the plurality of nodes;

causing a first node of the first section to communicate with a second node of the second section; and determining from the communication between the first and second nodes the nodal fault relating to at least one of the plurality of nodes, wherein determining the first and second sections further includes designating a plane dividing the plurality of nodes.

2. The method of claim 1, further comprising changing an orientation of the plane on a subsequent section determination.

3. The method of claim 2, further comprising using results achieved using a previous and the changed orientation of the plane to determine a common potential problem indicative of the nodal fault.

* * * * *